United States Patent [19]

Hirakawa

[11] Patent Number: 4,934,797
[45] Date of Patent: Jun. 19, 1990

[54] WIDE-ANGLE LENS SYSTEM OF A RETROFOCUS TYPE

[75] Inventor: Jun Hirakawa, Tokyo, Japan

[73] Assignee: Asahi Kogaku Kogyo Kabushiki Kaisha, Tokyo, Japan

[21] Appl. No.: 412,955

[22] Filed: Sep. 26, 1989

[30] Foreign Application Priority Data

Sep. 30, 1988 [JP] Japan .................................. 63-247146
Jul. 4, 1989 [JP] Japan .................................. 64-172781

[51] Int. Cl.$^5$ .................................................. G02B 13/18
[52] U.S. Cl. .................................................. 350/432
[58] Field of Search ................................. 350/432, 458

[56] References Cited

U.S. PATENT DOCUMENTS 4,759,619 7/1988 Nakamura et al. ................. 350/458

Primary Examiner—Bruce Y. Arnold
Assistant Examiner—Rebecca D. Gass
Attorney, Agent, or Firm—Sughrue, Mion, Zinn, Macpeak & Seas

[57] ABSTRACT

A wide-angle lens system of a retrofocus type comprises, in order from the object side, a weakly divergent front lens group and a convergent rear lens group and which effects focusing by moving only the rear lens group. The front lens group comprises, in order from the object side, a positive first lens having a convex surface directed toward the object, a negative meniscus second lens having a convex surface directed toward the object and a biconvex third lens. The lens system satisfies the following conditions:

$$1.1 < h_R/h_F < 1.3 \qquad (1)$$

$$-0.5 < f/f_F < 0.0 \qquad (2)$$

where $h_F$ and $h_R$ are the heights of paraxial ray intercept of the front and rear lens groups, respectively; f is the focal length of the overall system; and $f_F$ is the focal length of the front lens group.

2 Claims, 8 Drawing Sheets

WIDE-ANGLE LENS SYSTEM OF A RETROFOCUS TYPE

BACKGROUND OF THE INVENTION

The present invention relates to a photographic wide-angle lens system of a retrofocus type. More particularly, the present invention relates to a wide-angle lens system that has an aperture ratio and a half-view angle on the order of 1:2.0 and 42°, respectively and which effects focusing by moving part (i.e. the rear lens group) of the system.

Photographic wide-angle lens systems are generally of a retrofocus type which has a sufficiently long back focus to permit installation on single-lens reflex cameras.

Wide-angle lenses of a retrofocus type that feature an aperture ratio and a half-view angle on the order of 1:2.0 and 42°, respectively are available in many versions as described in JP-A-No. 59-185307 (the term "JP-A" as used herein means an "unexamined published Japanese patent application"), JP-B-No. 55-42364 (the term "JP-B" as used herein means an "examined Japanese patent publication") and JP-A-No. 55-164805. As auto-focus cameras have gained increasing acceptance these days, a need has arisen for the use of a lighter focusing section in order to reduce the load on the lens drive section. With wide-angle lenses of a retrofocus type, too, focusing by movement of only a part of the lens system has been desired since the front lens group of these wide-angle lenses is considerably heavy.

Typical examples of a wide-angle lens system that effects focusing by moving only part of it are described in JP-A-No. 62-249119 and JP-A-No. 62-291613.

The lens system proposed by JP-A-No. 62-249119 features a half-view angle of about 42° and effects focusing by moving only the rear lens group of a retrofocus type system. The major problem with this system is that its aperture ratio of 1:2.8 does not insure brightness and that it experiences a marked change in the position of extra axial image plane during focusing.

JP A-No. 62-291613 propose various designs for effecting focusing by moving the rear lens group. In these systems, however, the rear lens group is divided into two units that are to move independently of each other and hence, the construction of the lens barrel becomes unduly intricate.

The present invention has been accomplished in order to solve the aforementioned problems of the prior art and its principal object is to provide an improved wide-angle lens system of a retrofocus type that features an aperture ratio and a half-view angle on the order of 1:2.0 and 42°, respectively. In this lens system, focusing is effected by moving only the rear lens group not only to reduce the load on the lens drive section but also to simplify the construction of the lens barrel. The system also insures high performance over a wide range from infinity to near distance.

SUMMARY OF THE INVENTION

This object of the present invention can generally be attained by a wide-angle lens system of a retrofocus type which comprises, in order from the object side, a weakly divergent front lens group and a convergent rear lens group and which effects focusing by moving only the rear lens group. More specifically, the front lens group comprises, in order from the object side, a positive first lens having a convex surface directed toward the object, a negative meniscus second lens having a convex surface directed toward the object and a biconvex third lens, and the overall lens system satisfies the following conditions:

$$1.1 < h_R/h_F < 1.3 \quad (1)$$

$$-0.5 < f/f_F < 0.0 \quad (2)$$

where $h_F$ and $h_R$ are the heights of paraxial ray intercept of the front and rear lens groups, respectively; f is the focal length of the overall system; and $f_F$ is the focal length of the front lens group.

In a preferred embodiment of the present invention, said convergent rear lens group includes a diaphragm stop, with a divergent plane in the neighborhood of the diaphragm stop being an aspheric surface the negative power of which increases from the center outward, and the geometry of said aspheric surface satisfies the following condition:

$$(3) \quad 3.7 < \frac{\log(\Delta X_H/\Delta X_{\frac{H}{2}})}{\log 2} < 4.3$$

where $\Delta X$ is the amount of deviation from the paraxial spherical surface of the aspheric surface in the direction of the optical axis; $\Delta X_H$ is the amount of deviation in the marginal zone of the effective aperture; and $\Delta X$ is the amount of deviation at the position corresponding to half of the effective aperture.

The rear lens group comprises, in order from the object side, a negative meniscus lens having a convex surface directed toward the object, a positive lens, a diaphragm stop, a positive-to-negative or negative-to-positive cemented lens, a negative lens having an aspheric surface on the object side, a negative-to-positive cemented lens, and a positive meniscus lens having a convex surface directed toward the image side.

Figure 1:
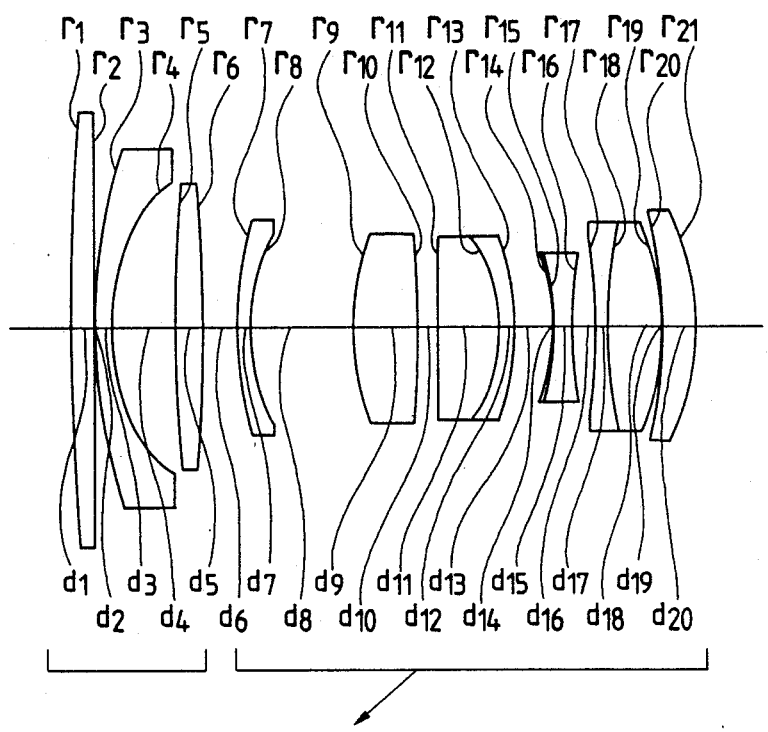
FIGS. 1, 4, 7, 10 and 13 are simplified cross-sectional views of lens systems according to Examples 1, 2, 3, 4 and 5, respectively, of the present invention.
Figure 4:
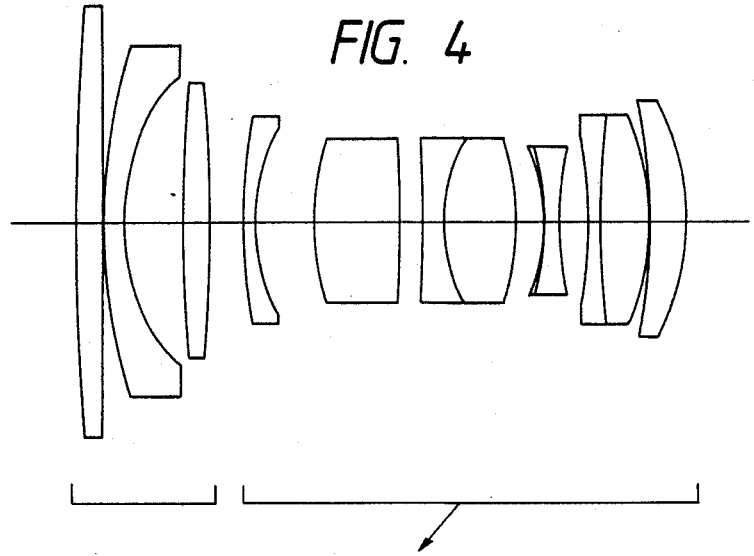
Figure 2:
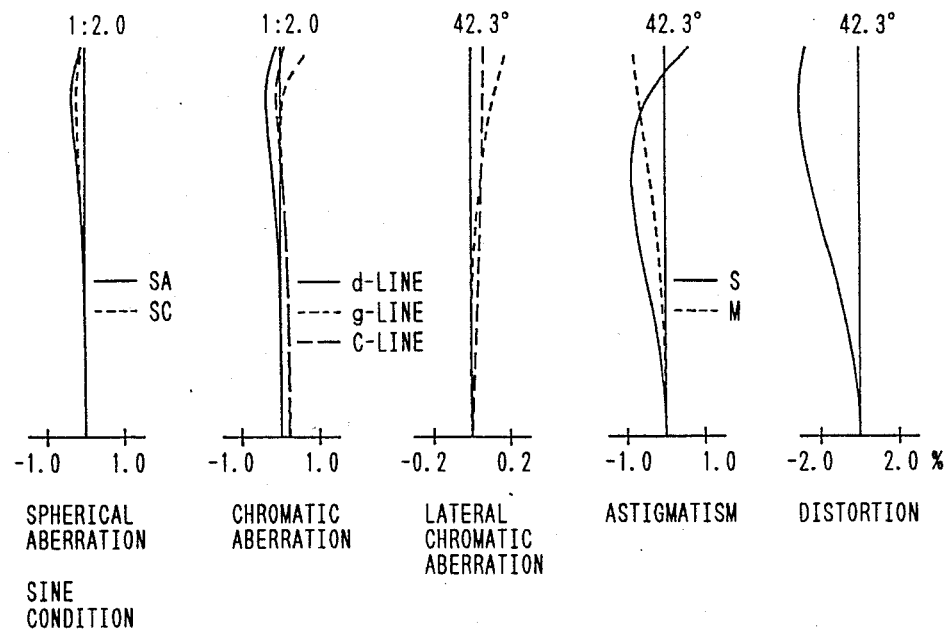
FIGS. 2, 5, 8 11 and 14 are graphs plotting the aberration curves obtained at infinity with the lens systems of Examples 1, 2, 3, 4 and 5, respectively.
Figure 3:
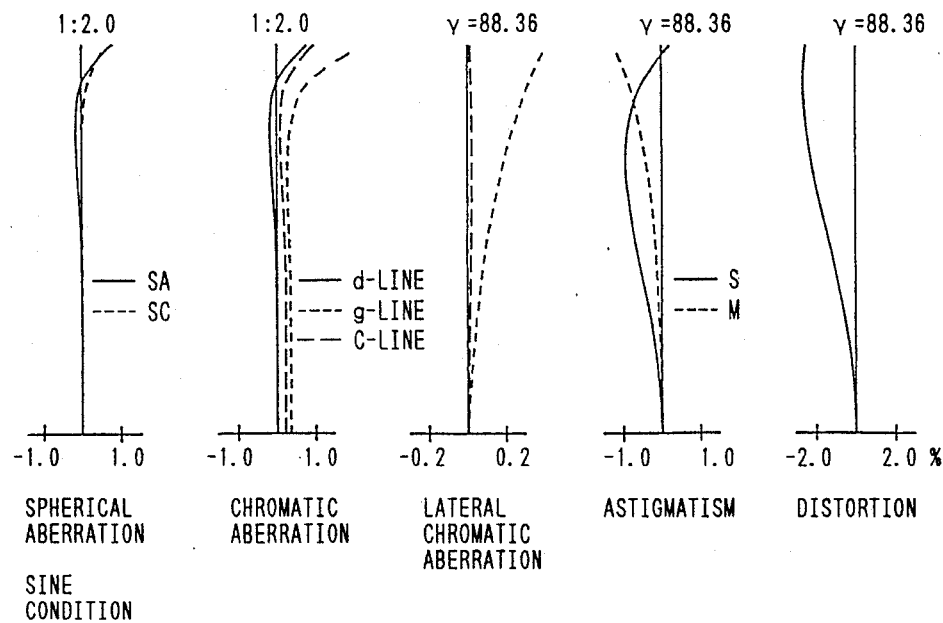
FIGS. 3, 6, 9, 12 and 15 are graphs plotting the aberration curves obtained at near distance with the lens systems of Examples 1, 2, 3, 4 and 5, respectively, with the imaging magnification being 1/10 in Examples 1–4 and 12.5 in Example 5.
Figure 5:
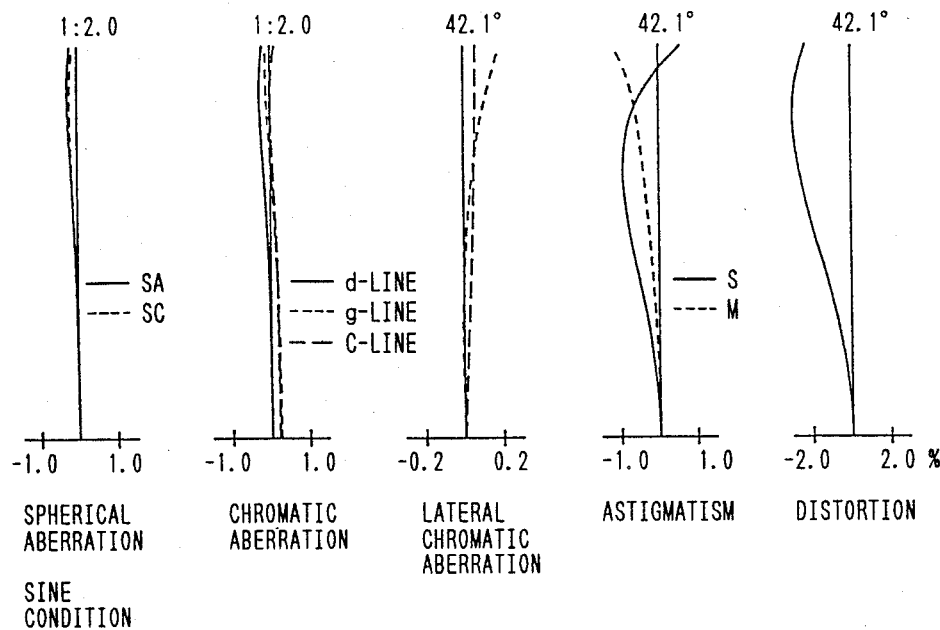
Figure 6:
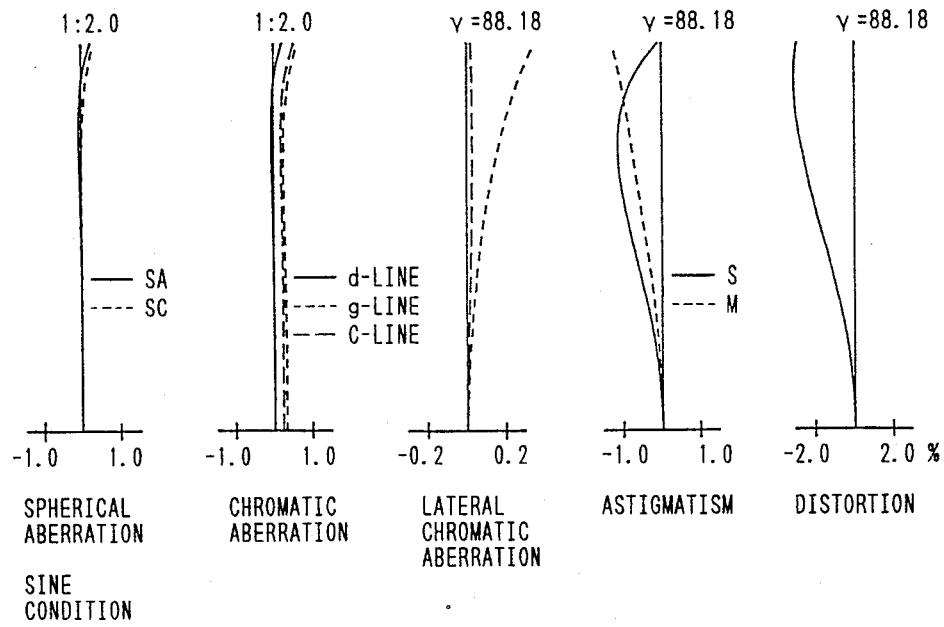
Figure 7:
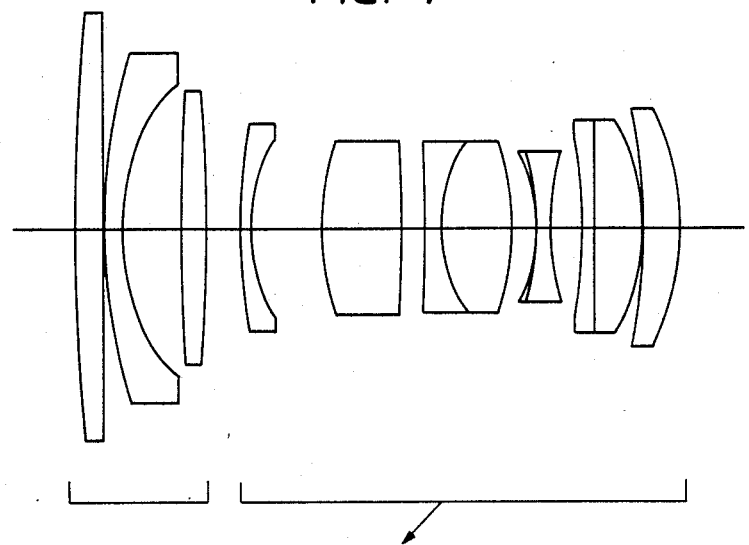
Figure 10:
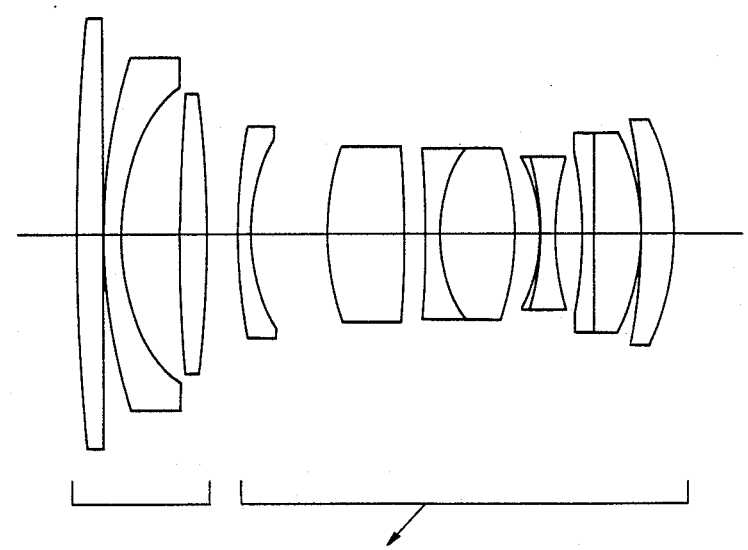
Figure 8:
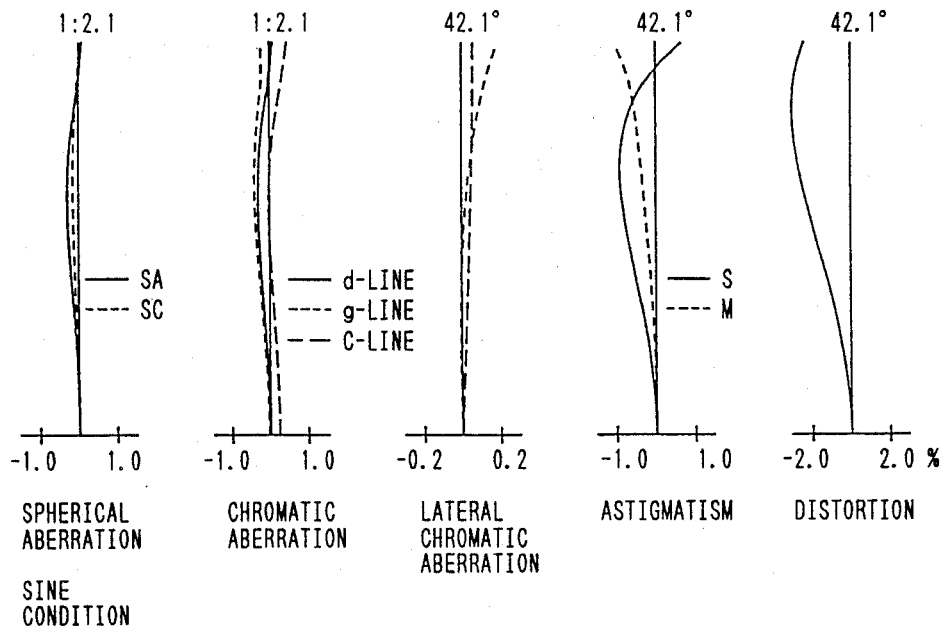
Figure 9:
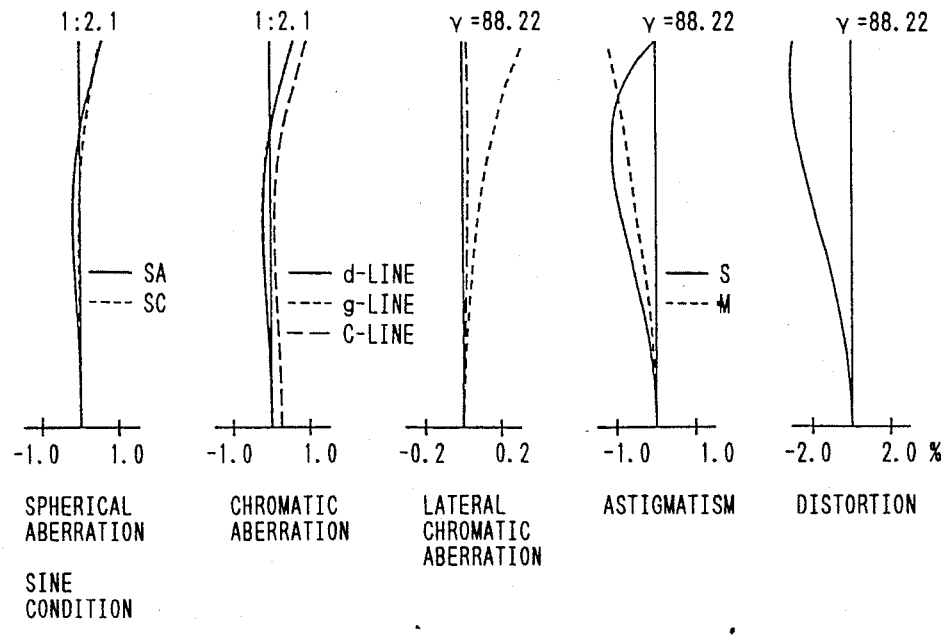
Figure 11:
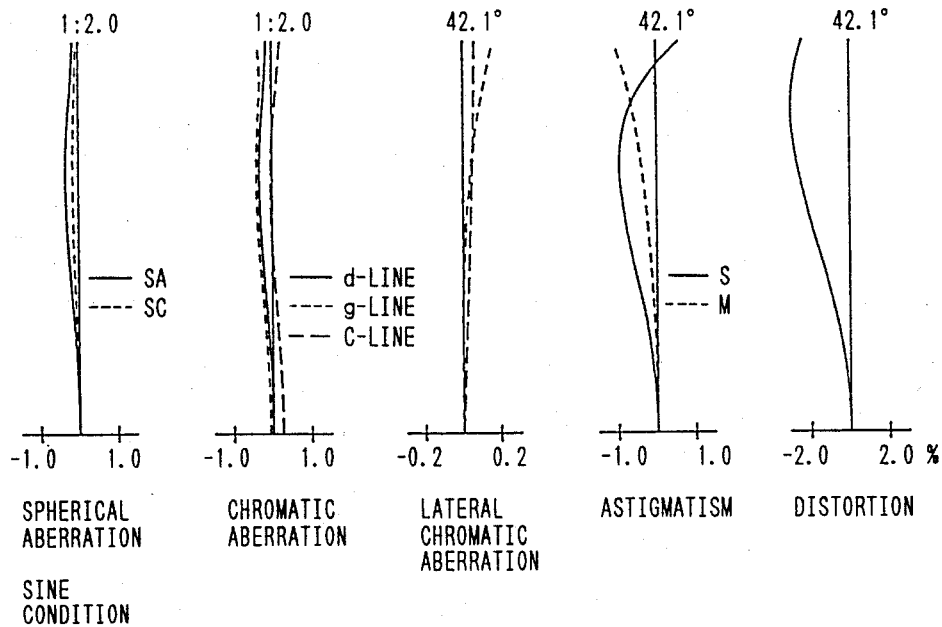
Figure 12:
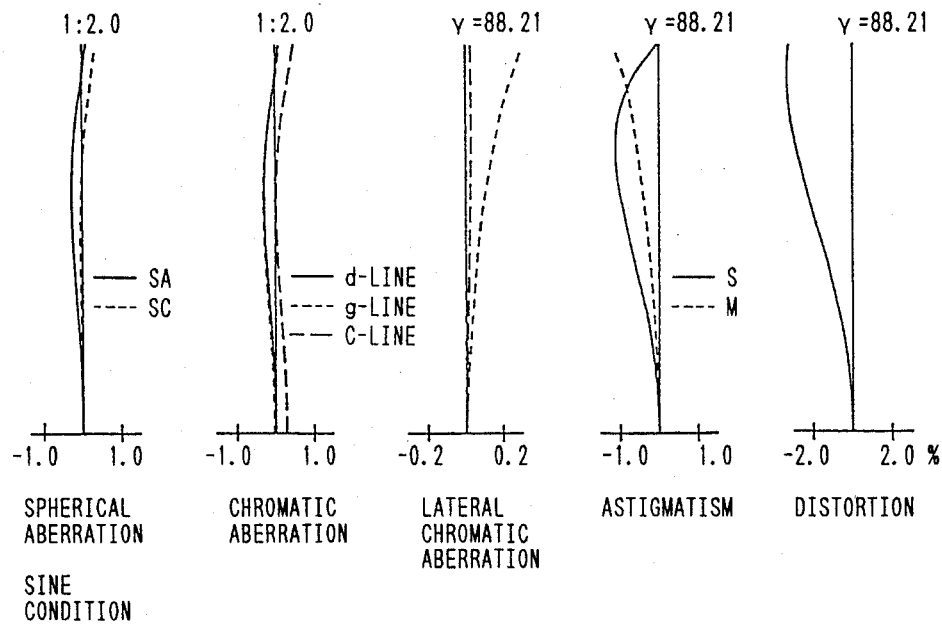
Figure 13:
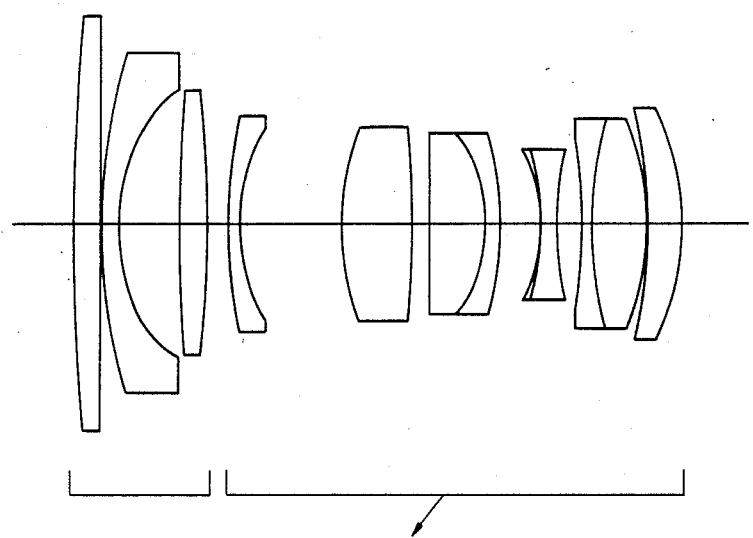
Figure 14:
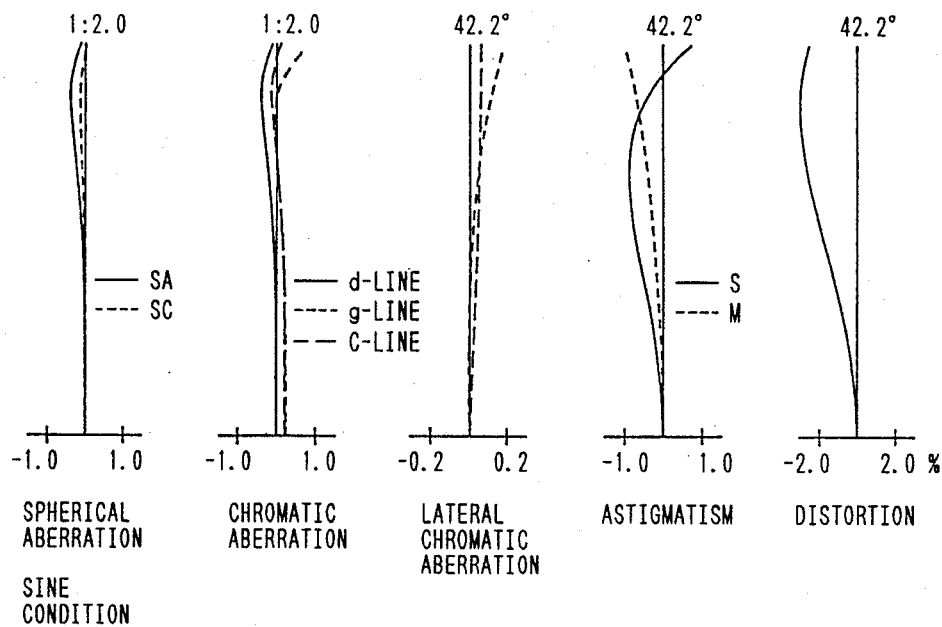
Figure 15:
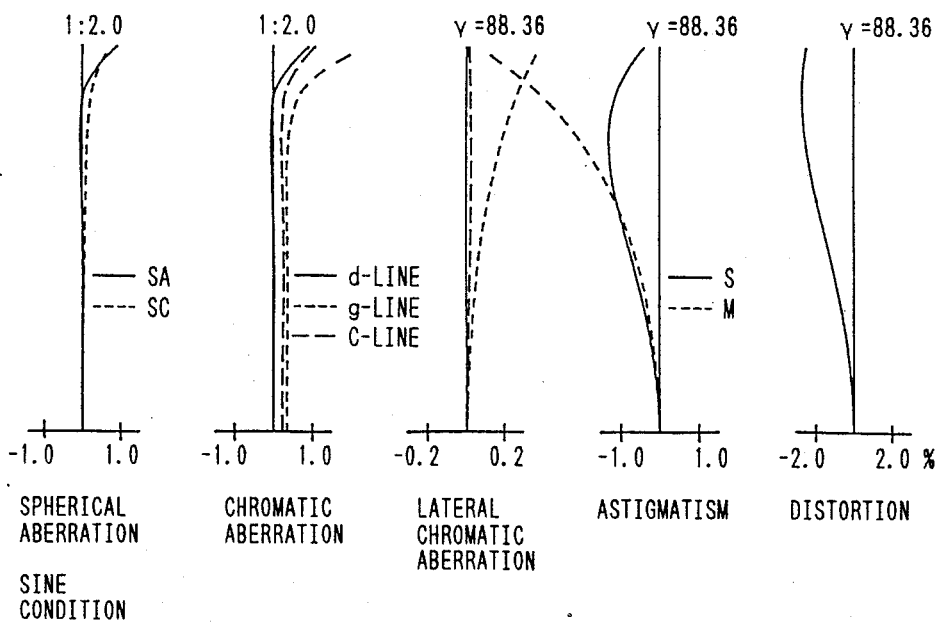

The arrow in each of the simplified cross-sectional views of lens systems indicate the direction in which the rear lens group is moved when focusing shifts from infinity to near distance.

DETAILED DESCRIPTION OF THE INVENTION

The front lens group of the system of the present invention is fixed and remains immobile during fixing. Its function is to increase the paraxial ray intercept with respect to the rear lens group, thereby insuring the necessary backfocus and reducing the angle of incidence of extra-axial rays into the rear lens group. This front lens group is weakly divergent [condition (2)]. If it has a power that does not satisfy condition (2), the paraxial ray intercept of the rear lens group will change when the latter moves during focusing, thus introducing a change in spherical aberration. Therefore, the front lens group is desirably substantially afocal, with its action being limited to the production of wide view angles.

In the front lens group of the system of the present invention, a negative lens and a positive lens are provided as the second and third lenses, respectively, so as to realize a substantially afocal configuration.

During focusing, the front lens group is fixed and only the rear lens group is moved to change the aerial distance between the front and rear lens groups, thereby effectively compensating for the change in the position of extra-axial image plane that occurs on account of the variation in the distance from object.

Conditions (1) and (2) must be satisfied by the system of the present invention in order to provide a configuration that is capable of exhibiting the actions described above.

Condition (1) specifies the degree by which the height of paraxial ray intercept of the rear lens group can be increased. If the lower limit of this condition is not reached (i.e., the height of paraxial ray intercept of the rear lens group remains small), difficulty is involved not only in insuring the necessary backfocus but also in covering wide view angles. If, on the other hand, the upper limit of condition (1) is exceeded (i.e., the height of paraxial ray intercept of the rear lens group is excessively great), it becomes necessary to increase the negative power of the second lens of the front group but this gives rise to coma. The height of paraxial ray intercept of the rear lens group could be increased by increasing the distance between the second and third lenses of the front group but this approach is not desirable since not only the size of the front lens group but also the overall length of the system will increase.

Further, if the front lens group is rendered substantially afocal and with the height of paraxial ray intercept of the rear lens group being increased from 1.1 to 1.3, the focal length of the rear lens group also increases from 1.1 to 1.3 times the focal length of the overall system. This relates to the amount by which the lens is advanced during focusing at a near-distance object and one may well say that the movement of the rear lens group provides a floating effect in which the change in the position of extra axial image plane that results from the variation in the aerial distance between the front and rear lens groups cancels the change in the position of extra-axial image plane that occurs when the object is at near distance, and vice versa.

If, however, condition (1) is not satisfied, with subsequent decrease in the height of paraxial ray intercept of the rear lens group (i.e., decrease in its focal length), the change in the aerial distance between the front and rear lens groups that occurs as a result of focusing at a near-distance object is too small to effectively compensate for the change in the position of extra-axial image plane that occurs when the object is at near distance. Conversely, if the height of paraxial ray intercept of the rear lens group is increased, with subsequent increase in the focal length of the latter, the rear lens group will move so greatly during focusing at the near-distance object that it becomes necessary to increase the distance between the front and rear lens groups already at the time when the object is at infinity, thus resulting in the increase in the overall size of the system. In addition, the change in the position of extra-axial image plane that occurs when the object is at near distance will become overcompensated.

Condition (2) sets forth the power that should be possessed by the front lens group. As already mentioned, the front lens group is desirably a near-afocal lens that is substantially devoid of power. If the front lens group has such a negative power that the lower limit of condition (2) is not reached, an undesirable change is spherical aberration occurs or extra-axial coma develops during focusing. If one wants to reduce the power of the front lens group to such an extent that the upper limit of condition (2) is exceeded, the negative power of the second lens in the front lens group has to be reduced but this introduces difficulty in satisfying condition (1) and is not favorable for the purpose of providing wide view angles.

In the system described in JP-A-No. 62-249119, the front lens group is composed of a positive and a negative lens element and is by no means afocal. Further, the focal length of the rear lens group is only about 1.07 times that of the overall system and this makes it difficult to attain effective compensation for the position of extra-axial image plane for a near distance object. The aperture ratio of this system is not bright enough (ca. 1:2.8).

The rear lens group of the system of the present invention preferably includes diaphragm stop and the divergent plane in the neighborhood of the diaphragm stop is an aspheric surface whose negative power increases from the center outward. The aspheric geometry desirably satisfies condition (3). The rear group of a wide-angle lens system of a retrofocus type has a strong positive power in order to converge the divergent rays of light emerging from the front group. Thus, spherical aberration tends to be undercompensated in the rear group while the Petzval sum tends to assume a large positive value.

If an aspheric surface is provided in the neighborhood of the diaphragm stop, extra-axial rays will not be substantially affected and instead axial rays alone will be influenced (see page 119 of "Designs and Applications of Aspheric Optical Systems", Trikeps Blue Papers No. 47, editted by Trikeps Planning Division and published Feb. 22, 1985). In terms of wavefront aberration, spherical aberration assumes a shape of the fourth order with respect to h of the pupil (h: a coordinate in the direction normal to the optical axis) (see H. Kubota, "Applied Optics", 2.7 Shape of Wavefront, pp. 68–69, 16th printing, published by Iwanami Shoten, Apr. 20, 1977).

Thus, by providing in the neighborhood of the diaphragm stop a aspheric surface having a shape of a substantially the fourth order with its negative power increasing from the center outward, spherical aberration that is apt to be undercompensated in lens systems of a retrofocus type can be effectively compensated without causing substantial effects on extra-axial rays of light.

In short, according to the present invention, extra-axial aberrations such as curvature of the field, lateral chromatic aberration and distortion are effectively compensated in the overall lens system whereas any residual spherical aberration is to be compensated by the aspheric surface in the neighborhood of the diaphragm stop.

Condition (3) roughly delineates the geometry of the aspheric surface and shows that it is substantially of the fourth order. If the aspheric surface is of higher orders that exceeds the upper limit of condition (3), marginal rays on the optical axis will be overcompensated. If the aspheric surface is of lower orders that do not reach the lower limit of condition (3), effective compensation for spherical aberration cannot be achieved. If the absolute value of asphericity were reduced, it would be possible to provide an aspheric surface of an order that is outside the range specified by condition (3). However, smaller absolute values of asphericity mean that the aspheric surface is less effective in compensation for spherical aberration, which certainly is not favorable for the purpose of the present invention.

EXAMPLES

Five examples of the present invention are described below with reference to data sheets, in which $F_{NO}$ is the aperture ratio, f, focal length, $\omega$, half-view angle, $f_B$, back focus, r, the curvature radius of an individual lens surface, d, lens thickness or the aerial distance between lenses, n, the refractive index of an individual lens at the d-line, and $\nu$, the Abbe number of an individual lens.

The geometry of an aspheric surface shall be expressed by the following equation:

$$x = ch^2/(1 + \sqrt{1 - (K+1)c^2h^2}) + \sum_{n}^{} A_n h^n$$

where x is a coordinate in the direction of the optical axis, h is a coordinate in the direction normal to the optical axis, c is curvature (a/r), k is a conicity constant, and $A_n$ is an asphericity coefficient (n=4, 6, 8 and 10).

For economic reasons, the aspheric lenses used in the examples consist of a spherical lens to which a transparent resin coating is applied. If desired, all-glass aspheric lenses may be used.

Example 1

$F_{NO} = 1:2.0$     $f = 100.00$
$\omega = 42.3°$     $f_B = 149.87$

| Surface No. | r | d | n | $\nu$ |
|---|---|---|---|---|
| 1 | 1270.220 | 11.89 | 1.69680 | 55.5 |
| 2 | 11749.505 | 0.41 | | |
| 3 | 280.530 | 7.15 | 1.80610 | 40.9 |
| 4 | 91.556 | 30.52 | | |
| 5 | 746.731 | 13.29 | 1.72916 | 54.7 |
| 6 | −746.731 | 16.35 | | |
| 7 | 226.247 | 5.31 | 1.74320 | 49.3 |
| 8 | 84.478 | 49.62 | | |
| 9 | 125.329 | 31.03 | 1.80518 | 25.4 |
| 10 | −540.040 | 10.21 | | |
| 11 | −3437.100 | 29.13 | 1.74320 | 49.3 |
| 12 | −66.836 | 6.53 | 1.80518 | 25.4 |
| 13 | −130.204 | 18.38 | | |
| 14 | −115.891 | 0.41 | 1.52010 | 50.8 |
| 15 | −115.891 | 8.17 | 1.78472 | 25.7 |
| 16 | 219.010 | 10.56 | | |
| 17 | −302.042 | 6.12 | 1.80518 | 25.4 |
| 18 | 285.971 | 25.85 | 1.77250 | 49.6 |
| 19 | −107.758 | 0.41 | | |
| 20 | −219.730 | 17.14 | 1.69680 | 55.5 |
| 21 | −101.248 | | | |

Asphericity coefficients of the 14th surface:
k = 0.0
$A_4 = -8.63 \times 10^{-7}$
$A_6 = 0.0$
$A_8 = 0.0$
$A_{10} = 0.0$
For imaging magnification of 1/10, $d_6 = 4.99$
$f_B = 161.22$
(1) $h_R/h_F = 1.226$
(2) $f/f_F = -0.303$
(3) $\dfrac{\log(\Delta X_H/\Delta X_{\frac{H}{2}})}{\log 2} = 4.00$

Example 2

$F_{NO} = 1:2.0$     $f = 100.00$
$\omega = 42.1°$     $f_B = 149.55$

| Surface No. | r | d | n | $\nu$ |
|---|---|---|---|---|
| 1 | 1158.002 | 13.04 | 1.69680 | 55.5 |
| 2 | −12118.576 | 0.41 | | |
| 3 | 284.413 | 7.13 | 1.80610 | 40.9 |
| 4 | 88.912 | 29.75 | | |
| 5 | 679.762 | 13.51 | 1.74950 | 35.3 |
| 6 | −679.762 | 16.22 | | |
| 7 | 272.150 | 5.30 | 1.69680 | 55.5 |
| 8 | 85.614 | 28.32 | | |
| 9 | 146.287 | 40.75 | 1.80518 | 25.4 |
| 10 | −529.806 | 10.19 | | |
| 11 | −639.188 | 10.19 | 1.69895 | 30.1 |
| 12 | 72.738 | 35.32 | 1.80610 | 40.9 |
| 13 | −115.808 | 11.7 | | |
| 14 | −111.446 | 0.41 | 1.52000 | 50.8 |
| 15 | −111.446 | 8.15 | 1.78472 | 25.7 |
| 16 | 214.278 | 12.91 | | |
| 17 | −267.373 | 6.11 | 1.80518 | 25.4 |
| 18 | 433.485 | 24.32 | 1.77250 | 49.6 |
| 19 | −111.879 | 0.41 | | |
| 20 | −268.509 | 19.00 | 1.69680 | 55.5 |
| 21 | −100.159 | | | |

Asphericity coefficients of the 14th surface:
k = 0.0
$A_4 = -8.22 \times 10^{-7}$
$A_6 = 0.0$
$A_8 = 0.0$
$A_{10} = 0.0$
For imaging magnification of 1/10, $d_6 = 5.01$
$f_B = 160.76$
(1) $h_R/h_F = 1.221$
(2) $f/f_F = -0.286$
(3) $\dfrac{\log(\Delta X_H/\Delta X_{\frac{H}{2}})}{\log 2} = 4.00$

Example 3

$F_{NO} = 1:2.1$     $f = 100.00$
$\omega = 42.1°$     $f_B = 149.59$

| Surface No. | r | d | n | $\nu$ |
|---|---|---|---|---|
| 1 | 849.409 | 13.41 | 1.69680 | 55.5 |
| 2 | 6493.526 | 0.41 | | |
| 3 | 265.972 | 7.13 | 1.78590 | 44.2 |
| 4 | 85.813 | 30.29 | | |
| 5 | 746.266 | 12.68 | 1.74950 | 35.3 |
| 6 | −756.266 | 16.35 | | |
| 7 | 279.645 | 5.30 | 1.69680 | 25.4 |
| 8 | 85.976 | 35.90 | | |
| 9 | 135.777 | 36.69 | 1.80518 | 25.4 |
| 10 | −407.664 | 10.60 | | |
| 11 | −559.609 | 6.52 | 1.74000 | 28.3 |
| 12 | 63.392 | 34.57 | 1.80440 | 39.6 |
| 13 | −121.199 | 11.21 | | |
| 14 | −114.146 | 0.41 | 1.52010 | 50.8 |
| 15 | −114.146 | 8.15 | 1.78472 | 25.7 |
| 16 | 200.318 | 13.33 | | |
| 17 | −272.165 | 6.11 | 1.80518 | 25.4 |
| 18 | 1886.669 | 22.34 | 1.77250 | 49.6 |
| 19 | −111.292 | 0.41 | | |
| 20 | −323.253 | 20.2 | 1.61800 | 63.4 |
| 21 | −99.494 | | | |

Asphericity coefficients of the 14th surface:
k = 0.0
$A_4 = -7.897 \times 10^{-7}$
$A_6 = -5.151 \times 10^{-11}$
$A_8 = 1.817 \times 10^{-14}$
$A_{10} = 0.0$
For imaging magnification of 1/10, $d_6 = 4.99$
$f_B = 160.95$
(1) $h_R/h_F = 1.219$ -continued (2) $f/f_F = -3.02$ (3) $\dfrac{\log(\Delta X_H/\Delta X_{\frac{H}{2}})}{\log 2} = 4.0003$ Example 4

$F_{NO} = 1:2.0 \quad\quad f = 100.00$
$\omega = 42.1° \quad\quad f_B = 153.12$

| Surface No. | r | d | n | ν |
|---|---|---|---|---|
| 1 | 1039.279 | 12.51 | 1.72916 | 54.7 |
| 2 | 7744.716 | 0.41 | | |
| 3 | 272.341 | 7.13 | 1.83400 | 37.2 |
| 4 | 92.782 | 29.31 | | |
| 5 | 731.794 | 12.84 | 1.76180 | 27.1 |
| 6 | −596.986 | 15.87 | | |
| 7 | 312.760 | 5.30 | 1.72916 | 54.7 |
| 8 | 83.319 | 37.82 | | |
| 9 | 128.385 | 36.69 | 1.80518 | 25.4 |
| 10 | −459.874 | 10.60 | | |
| 11 | −528.398 | 6.52 | 1.74000 | 28.3 |
| 12 | 64.793 | 35.67 | 1.80440 | 39.6 |
| 13 | −126.675 | 11.80 | | |
| 14 | −114.137 | 1.22 | 1.52010 | 50.8 |
| 15 | −88.794 | 7.34 | 1.78472 | 25.7 |
| 16 | 223.786 | 10.72 | | |
| 17 | −288.491 | 6.11 | 1.80518 | 25.4 |
| 18 | −1508.807 | 20.48 | 1.77250 | 49.6 |
| 19 | −108.715 | 0.41 | | |
| 20 | −299.707 | 19.22 | 1.61800 | 63.4 |
| 21 | −95.521 | | | |

Asphericity coefficients of the 14th surface:
$k = 0.0$
$A_4 = -7.869 \times 10^{-7}$
$A_6 = -5.331 \times 10^{-11}$
$A_8 = 1.765 \times 10^{-14}$
$A_{10} = 0.0$
For imaging magnification of 1/10, $d_6 = 4.95$
$f_B = 164.04$
(1) $h_R/h_F = 1.200$
(2) $f/f_F = -0.250$ (3) $\dfrac{\log(\Delta X_H/\Delta X_{\frac{H}{2}})}{\log 2} = 4.0003$ Example 5

$F_{NO} = 1:2.0 \quad\quad f = 100.00$
$\omega = 42.2° \quad\quad f_B = 149.86$

| Surface No. | r | d | n | ν |
|---|---|---|---|---|
| 1 | 1002.981 | 12.81 | 1.69680 | 55.5 |
| 2 | 33080.413 | 0.41 | | |
| 3 | 277.966 | 7.15 | 1.80610 | 40.9 |
| 4 | 82.230 | 29.58 | | |
| 5 | 602.539 | 13.69 | 1.71300 | 53.8 |
| 6 | −602.539 | 10.30 | | |
| 7 | 296.593 | 5.31 | 1.74320 | 49.3 |
| 8 | 95.957 | 48.19 | | |
| 9 | 123.294 | 33.65 | 1.80518 | 25.4 |
| 10 | −472.608 | 10.21 | | |
| 11 | −1421.406 | 25.82 | 1.74320 | 49.3 |
| 12 | −66.010 | 6.53 | 1.80518 | 25.4 |
| 13 | −130.665 | 17.75 | | |
| 14 | −114.773 | 0.41 | 1.52010 | 50.8 |
| 15 | −114.773 | 81.7 | 1.78472 | 25.7 |
| 16 | 211.713 | 10.94 | | |
| 17 | −357.482 | 6.12 | 1.80518 | 25.4 |
| 18 | 246.984 | 25.57 | 1.77250 | 49.6 |
| 19 | −115.024 | 0.41 | | |
| 20 | −234.773 | 17.61 | 1.71300 | 53.8 |
| 21 | −100.917 | | | |

Asphericity coefficients of the 14th surface:
$k = 0.0$
$A_4 = -8.65 \times 10^{-7}$
$A_6 = 0.0$
$A_8 = 0.0$
$A_{10} = 0.0$
For imaging magnification of 1/10, $d_6 = 1.10$
$f_B = 159.06$ -continued (1) $h_R/h_F = 1.231$
(2) $f/f_F = -0.327$ (3) $\dfrac{\log(\Delta X_H/\Delta X_{\frac{H}{2}})}{\log 2} = 4.00$ As described on the foregoing pages, the system of the present invention effects focusing by moving only the rear lens group and this contributes not only to simplicity in the construction of the lens barrel but also to reduction in the load on the lens drive section of an auto-focus camera. Further, the characteristic construction of the front lens group as combined with satisfaction of conditions (1) and (2), preferably (1)–(3), makes it possible to produce a wide-angle lens system of a retrofocus type that insures high performance over a broad range from infinity to near distance.

As will be apparent from the examples, the weight of the optical material of which the rear lens group is made is almost half the total weight of the optical material used in the system. Therefore, the method of effecting focusing by moving the rear lens group is more effective than the approach of moving the entire system for the purpose of reducing the load on the lens drive section.

What is claimed:

1. A wide-angle lens system of a retrofocus type that comprises, in order from the object side, a weakly divergent front lens group and a convergent rear lens group and which effects focusing by moving only the rear lens group, said front lens group comprising, in order from the object side, a positive first lens having a convex surface directed toward the object, a negative meniscus second lens having a convex surface directed toward the object and biconvex third lens, said lens system satisfying the following conditions:

$$1.1 < h_R/h_F < 1.3 \quad (1)$$

$$-0.5 < f/f_F < 0.0 \quad (2)$$

where $h_F$ and $h_R$ are the heights of paraxial ray intercept of the front and rear lens groups, respectively; f is the focal length of the overall system; and $f_F$ is the focal length of the front lens group.

2. A wide-angle lens system of a retrofocus type according to claim 1 wherein said convergent rear lens group includes a diaphragm stop, with a divergent plane in the neighborhood of the diaphragm stop being an aspheric surface the negative power of which increases from the center outward, the geometry of said aspheric surface satisfying the following condition:

$$(3)\; 3.7 < \dfrac{\log(\Delta X_H/\Delta X_{\frac{H}{2}})}{\log 2} < 4.3$$

where $\Delta X$ is the amount of deviation from the paraxial spherical surface of the aspheric surface in the direction of the optical axis; $\Delta X_H$ is the amount of deviation in the marginal zone of the effective aperture; and $\Delta X_{\frac{H}{2}}$ is the amount of deviation at the position correspond half cf the effective aperture.

* * * * *